2,898,207

ACIDULATION OF PHOSPHATE

Karl F. Schilling, Manly J. Powell, and Emory A. Brice, Lakeland, Fla., assignors to Minerals & Chemicals Corporation of America, a corporation of Maryland No Drawing. Application March 2, 1954
Serial No. 413,712

11 Claims. (Cl. 71—37)

This invention teaches a method of treating phosphate rock so as to render it available as a fertilizer and, if desired, substantially free of fluorine; it also teaches a way of converting phosphatic materials in general to greater citrate solubility, water solubility or both. By phosphatic material is meant a phosphate-containing substance which can be phosphate rock, a pure salt, a phosphate-containing waste product from a recovery plant, a naturally occuring phosphate-containing deposit or any other aggregrate which has phosphate in it. Some examples of phosphatic materials are: the salts tribasic calcium phosphate and aluminum phosphate, phosphatic slime, "leached zone" matrix and slime from leached zone matrix.

Phosphate rock, as found in nature, consists essentially of fluorapatite, a compound which can be thought of as tricalcium phosphate intimately associated with $CaF_2$. Since fluorapatite is only very slowly dissolved by plant juices, it is considered unavailable as a plant nutrient and, therefore, it must be converted to a soluble form before being suitable for use as a phosphatic fertilizer. The most common important method of conversion is acidulation of the phosphate rock with sulfuric acid to produce the well known superphosphate. The principal reaction in this process has long been given as:

$$Ca_3(PO_4)_2 + 2H_2SO_4 + H_2O$$
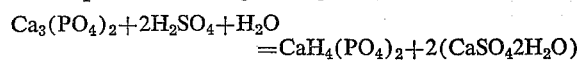
$$= CaH_4(PO_4)_2 + 2(CaSO_4 2H_2O)$$

The first step in making superphosphate is to grind the phosphate rock. The ground rock is then mixed with chamber acid (60 to 70 percent sulfuric acid, $H_2SO_4$) and the resulting syrupy mass is dumped into a den and left there for six to twenty-four hours to allow the reactions to go on to completion. From there, the crude material is transfered to a storage pile where it remains for eight to ten weeks to cure. The final product is a powdery aggregate containing all of the sulfate in the chamber acid as calcium sulfate, an impurity, and much of the fluorine (up to 75 percent) initially in the rock. In some phosphate treating plants, the crude superphosphate from the den is granulated before being aged, in which case curing time is considerably reduced. However, even after granulation (which includes, as one step, a drying operation) the material requires at least ten days for aging.

Another well-known way of converting phosphate rock to a form which plant life can assimilate is to treat it with phosphoric acid to make so-called triple superphosphate. The main reaction is usually represented as:

$$Ca_3(PO_4)_2 + 4H_3PO_4 = 3CaH_4(PO_4)_2$$

To make triple superphosphate, ground rock and phosphoric acid (about 62 percent $H_3PO_4$) are mixed for several hours, and the mixture is then aged thirty to forty days. After this, hot gases are passed over the material to remove most of the remaining moisture. Making triple superphosphate is an indirect way of acidulating with sulfuric acid, since the phosphoric acid used is obtained from phosphate rock by treating it with $H_2SO_4$. However, triple superphosphate contains no diluting calcium sulfate as regular superphosphate does.

Patent No. 1,020,153 to Newberry and Barrett describes the use of a mixture of sulfuric and hydrochloric acids for acidulating phosphate rock. Their idea was to treat phosphate rock with the mixed acids to form monocalcium phosphate, filter the liquid from the calcium sulfate and other solids, evaporate the filtrate to dryness and heat the recovered salts for conversion to dicalcium phosphate. They gave, as their main reactions:

$$Ca_3(PO_4)_2 + H_2SO_4 + 2HCl$$
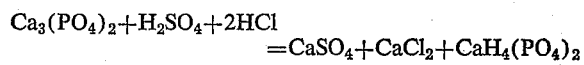
$$= CaSO_4 + CaCl_2 + CaH_4(PO_4)_2$$

$$CaCl_2 + CaH_4(PO_4)_2 + heat = 2CaHPO_4 + 2HCl$$

Dicalcium phosphate, although not as water-soluble as monocalcium phosphate (the main ingredient of superphosphate and triple superphosphate), is still considered to be soluble and available as a plant food.

An object of the present invention is to provide a new and improved process of converting natural phosphates into soluble phosphates suitable for use as fertilizers. Another object is to provide a new and improved process of converting natural phosphates into soluble phosphates sufficiently low in fluorine to meet animal stock feed specifications. The present invention is the result of our discovery that chlorosulfonic acid ($HOSO_2Cl$) may advantageously be used in converting phosphate rock into soluble form for use as a plant food or as animal stock feed.

Briefly, the most important process of the present invention consists of acidulating phosphate rock with chlorosulfonic acid ($HOSO_2Cl$) and then treating the acidulated product in any one of a number of ways. The choice of treatment depends upon what type of product is desired. If defluorination is not necessary, the acidulated material requires only aging during which HCl comes off and the phosphate, which is largely water soluble, partially reverts to an ammonium citrate soluble form. If, on the other hand, almost complete defluorination is desired, the reaction product is heated to about 350° C. and held at about that temperature until gas evolution substantially ceases. Needless to say, any number of products intermediate between these two extremes can be produced through manipulation of heating temperature and heating time; and the quantity of chlorosulfonic acid used has a direct bearing on quality of product.

Although, as mentioned, there are many ways to carry out the process of our invention, we prefer the process in which the acidulation product is heated to substantially defluorinate it. One of the principal advantages of our process is due to our preferred way of practicing it, i.e., the almost complete elimination of fluorine at the comparatively low temperature of about 350° C., instead of the much higher temperatures required in processes at present in use.

We have ascertained that during acidulation of the phosphate with chlorosulfonic acid a good part of the chlorine from the acid evolves as HCl, and the $P_2O_5$ is largely converted to a water soluble form. As the acidulated product is heated, in the second step of our process, HCl, $SO_3$ and fluorine (as HF) are driven off in quantities which vary with the temperature. Most of the HCl can be eliminated at a very low temperature, the fluorine at a somewhat higher one, and the $SO_3$ at the still higher (but relatively low) temperature of about 350° C. While it is true that most of the fluorine can be driven off at a temperature lower than 350° C., we have found by tests that to lower the fluorine content enough to make the product substantially fluorine-free and satisfy animal feed requirements heating at about 350° C. is necessary. If the heating is carefully controlled, the separate gases can be recovered in relatively pure states. However, even should they be collected as a mixture, it is not difficult or costly to separate them since their boiling points are quite disparate. In addition to driving off gases, the heating step of our process causes the phosphate to revert from water solubility to citrate solubility.

In practicing the method of the present invention, finely divided rock phosphate is mixed with chlorosulfonic acid, and the mixture is then agitated until the ensuing reactions have substantially subsided. The proportions for mixing are such that the molar ratios of acid to tricalcium phosphate fall within the range from about 2:1 to about 6:1, inclusive, and the requirements of the acid consuming impurities in the rock have been met. The degree of fineness of the phosphate is not as critical in the case of chlorosulfonic acidulation as in acidulations with conventional acids; in fact, we have ascertained that chlorosulfonic acid reacts rapidly and thoroughly with unground phosphate flotation concentrates. The reaction of chlorosulfonic acid with ground phosphate is fast and exothermic, giving off fumes of HCl which can be recovered. The product is a substantially dry, free flowing material.

When a product low in fluorine is required, the said reaction product resulting from chlorosulfonic acidulation is heated at a controlled temperature, which should not exceed about 400° C. Tests have indicated 350° C. to be about the optimum maximum heating temperature. Above 350° C. some of the $P_2O_5$ volatilizes, and at 550° C. the remaining $P_2O_5$ is converted to an unavailable form. The heating is continued until gas evolution ceases, the residual product being a dry free flowing powder free of chlorine and practically free of fluorine. During this heating the gases can be collected if so desired.

Advantages of the above described process, over the prior art superphosphate and triple superphosphate processes, include (1) the product comes directly from the process dry and in granular form; (2) the acidulation reactions are fast, thus obviating or greatly reducing aging time; (3) the product can be defluorinated (within the process) to the point where it meets stock feed-supplement specifications, without heating to the high temperatures heretofore required; and (4) the fluorine is recoverable from the phosphate rock as HF.

The process of our invention, which we have described, differs from, and is superior to, the Newberry and Barrett mixed acid method of converting phosphate rock to dicalcium phosphate, principally in that it a dry process, whereas theirs is a wet one. Newberry and Barrett acidulate the phosphate rock with aqueous solutions of $H_2SO_4$ and HCl, thus introducing large excesses of water into the system. The subsequent steps of filtration and evaporation of the filtrate to dryness required in their process are unnecessary in our process since no water attends the input acid. The dissimilarity between the two processes goes further than this, however, chlorosulfonic acid is not chemically equivalent to a mixture of $H_2SO_4$ and HCl; and we have ascertained that the two ingredient "acids" do not act alike with phosphate rock.

The following example illustrates the practicing of a process of our invention. It is not to be inferred from this example that the invention is limited to the specific methods described, since many other variations are possible without departing from the spirit of said invention.

*Example I*

Ground phosphate rock was fed into a reactor containing chlorosulfonic acid in amount representing a molar ratio of 1:6 (moles of tricalcium phosphate to moles of acid) plus sufficient excess to react with the $CaF_2$ and $CaCO_3$ in the rock. The weights of rock and acid used were: 250 gm. rock, 499.4 gm. acid. The rock was fed by means of a screw feeder at a rate of approximately 75 gm. per minute. The reacting mass was stirred and cooled throughout the process. After the rock had all been added, the mass was stirred for an additional half hour, and was then removed from the reactor and weighed. All gases evolved during the procedure were absorbed in an aqueous 20% NaOH solution.

Portions of the acidulated rock (in some cases 10 gm.; in others, 20) were weighed out and each heated for 30 minutes at various temperatures, ranging from 135° C. through 550° C. All gases evolved during heating were flushed from the system with air and collected by absorption in an aqueous 10% NaOH solution. The residues were then analyzed. It was found that on heating a portion of the acidulated rock to about 350° C., all the chlorine was removed, practically all the fluorine was removed, and substantially all the phosphate was rendered ammonium citric acid soluble; and the ratio of $P_2O_5$ to fluorine was about 180 to 1, which is much superior to the permissible limit of about 92 to 1 for animal feed supplement requirements. The $P_2O_5$ grade was roughly equivalent to that of ordinary superphosphate.

When the chlorosulfonic acidulated phosphate rock was treated at lower temperatures, although most of the chlorine was removed, a good deal of fluorine remained in the product; while at the higher temperatures, e.g., 450° C., a larger part of the phosphate reverted to the insoluble form.

Almost as good results were obtained in tests in which the ratio of chlorosulfonic acid to phosphate rock was 4 to 1, but again it was found that at temperatures of about 450° C. a larger part of the phosphate reverted to the ammonium citrate insoluble form. Also it was found that at this higher temperature some $P_2O_5$ was removed from the acidulated rock by volatilization. While it is true that a larger part of the phosphate reverts to insolubility (unavailability to plants) upon heating the chlorosulfonic acid treated material at about 450° C., it should not be inferred that significant reversion occurs at temperatures lower than 450° C.

In tests in which the proportion of acid to phosphate rock was less than 4 to 1, e.g., about 2 to 1, the elimination of fluorine, although considerable, was not nearly as complete as when higher ratios were employed, and a tendency was noted of a reversion of the phosphate to the insoluble form at lower temperatures, although the products did contain high proportions of citrate soluble phosphate.

Therefore, in acidulating phosphate rock according to our invention, we believe that the chlorosulfonic acid should be used in quantities such that the requirements of the significant acid-consuming impurities in the rock are met; that the molecular ratio of said acid to calcium phosphate in the rock should be between 4 and 6, inclusive; and that the temperatures to which the reaction product is heated should be at least about 300° C. and not exceeding about 400° C.

Heretofore the emphasis has been on the treatment of phosphate rock but, as had already been pointed out, other phosphatic substances can also be acidulated in accordance with our invention. Following is the description of an acid treatment of leached zone slime in illustration of this. Our invention may also be applied to the so-called leach zone material, in which the phosphatic material is mixed with considerable quantities of clay, which is generally conceded to be kaolin, and to other phosphatic slimes in which montmorillonite is thought to be the clay constituent.

*Example II*

Dried and ground leached zone matrix slime (250 gm.) was fed to an approximately equal weight of chlorosulfonic acid (265 gm.) in a reactor which was sealed from the atmosphere by a gas absorption train connected to an aspirator. The resultant mixture was mechanically stirred for half an hour, during which little heat or gas evolved, and then the reactor was opened.

The product was moist and sticky in appearance when first exposed to the air but it soon commenced to give off dense fumes of HCl with the evolution of heat; this might have been caused by a reaction of the product with moisture in the air. During the fuming the material underwent a change in texture such that the final product was a dry, hard clinker—so hard, in fact, that it had to be chipped out of the reaction pot. This product, upon analysis, was found to contain substantially all of the $P_2O_5$ of the feed slime, most of it available, and practically none of the chlorine from the acid. About 95% of the available $P_2O_5$ was ascertained to be water soluble. We have found that in some cases the reaction product obtained from the leach zone slime must be heated in order to convert the phosphate to a citrate soluble form.

Most of the phosphate in leached zone slime is tied up with aluminum, not calcium as in phosphate rock. Regular phosphatic slime, however, is usually somewhere between phosphate rock and leached zone slime mineralogically, containing significant amounts of both aluminum and fluorapatite.

Samples of phosphatic slime, aluminum phosphate, tricalcium phosphate, dicalcium phosphate and monocalcium phosphate were each acidulated with chlorosulfonic acid and in every case the $P_2O_5$ was very effectively altered to higher citrate solubility, higher water solubility, or both.

We claim:

1. In a process for converting a phosphatic material to a form in which its phosphorous could be more quickly assimilated by plants, the step of reacting said material with chlorosulfonic acid.

2. A process for the production from phosphate rock of a calcium phosphate product in which the phosphate is substantially available to plants, comprising the steps of reacting a suitably-sized phosphate rock material with chlorosulfonic acid, removing the gases evolved during the reaction, and aging the reaction product to obtain a final product.

3. A process for the production from phosphate rock of a calcium phosphate product in which the phosphate is substantially available to plants, comprising the steps of reacting a suitably-sized phosphate rock material with chlorosulfonic acid, removing the gases evolved during the reaction, heating the reaction product but not to the extent of significant $P_2O_5$ reversion to ammonium citrate insolubility, removing the gases evolved during the heating, and recovering the residue as the final product.

4. A process for the production from phosphate rock of a calcium phosphate product in which the phosphate is substantially available to plants and substantially free of fluorine, comprising the steps of reacting a suitably-sized phosphate rock material with chlorosulfonic acid in quantity such that the requirements of the significant acid-consuming impurities in the rock are met and the molecular ratio of said acid to calcium phosphate in said rock is between 4 and 6, inclusive, removing the gases evolved during the reaction, heating the reaction product to a temperature of at least about 300° C. and not exceeding about 400° C., subjecting the product to heating within the aforesaid temperature range until gas evolution has substantially ceased, removing the gases evolved during the heating, and recovering the residue as the final product.

5. The process of claim 1 in which the phosphatic material consists largely of aluminum phosphate.

6. The process of claim 1 in which the phosphatic material consists of phosphatic slimes.

7. The process of claim 1 in which the phosphatic material consists of leach zone slimes.

8. A process for the production from phosphatic slimes of a phosphate product in which the phosphate is substantially available to plants comprising the steps of reacting the phosphatic slimes with chlorosulfonic acids and removing the gases evolved during the reaction.

9. The process of claim 8 in which the phosphate constituent of the phosphatic slimes is composed largely of aluminum phosphate.

10. The process of claim 8 in which the acidulated product is heated at a temperature not exceeding 500° C.

11. The process of claim 9 in which the acidulated product is heated at a temperature not exceeding 500° C.

References Cited in the file of this patent

UNITED STATES PATENTS

| | | |
|---|---|---|
| 709,185 | Terne | Sept. 16, 1902 |
| 1,271,387 | Taveau | July 2, 1918 |
| 1,837,284 | Ober et al. | Dec. 22, 1931 |
| 2,308,220 | Waggaman | Jan. 12, 1943 |
| 2,418,203 | Stauffer | Apr. 1, 1947 |

FOREIGN PATENTS

| | | |
|---|---|---|
| 365,945 | Great Britain | Jan. 28, 1932 |
| 469,098 | Canada | Oct. 31, 1950 |

OTHER REFERENCES

Mellor: Comprehensive Treatise on Inorganic and Theoretical Chemistry, 1930, vol. 10, pages 686–688.

Unit Process in Organic Synthesis, 3d ed., 1947, McGraw-Hill Co., Groggins, pages 286–288.

UNITED STATES PATENT OFFICE

CERTIFICATE OF CORRECTION

Patent No. 2,898,207                 August 4, 1959

Karl F. Schilling et al

It is hereby certified that error appears in the printed specification of the above numbered patent requiring correction and that the said Letters Patent should read as corrected below.

Column 3, line 51, for "it a" read -- it is a --; column 5, line 23, after "aluminum" insert -- phosphate --.

Signed and sealed this 5th day of April 1960.

(SEAL)
Attest:

KARL H. AXLINE
Attesting Officer

ROBERT C. WATSON
Commissioner of Patents